United States Patent
Starsinic et al.

(10) Patent No.: US 10,243,954 B2
(45) Date of Patent: Mar. 26, 2019

(54) ACCESS NETWORK ASSISTED BOOTSTRAPPING

(71) Applicant: CONVIDA WIRELESS, LLC, Wilmington, DE (US)

(72) Inventors: Michael F. Starsinic, Newtown, PA (US); Guang Lu, Thornhill (CA); Suresh Palanisamy, Namakkal District (IN); Qing Li, Princeton Junction, NJ (US); Dale N. Seed, Allentown, PA (US)

(73) Assignee: Convida Wireless, LLC, Wilmington, DE (US)

(*) Notice: Subject to any disclaimer, the term of this patent is extended or adjusted under 35 U.S.C. 154(b) by 0 days.

(21) Appl. No.: 15/207,163

(22) Filed: Jul. 11, 2016

(65) Prior Publication Data
US 2016/0323277 A1 Nov. 3, 2016

Related U.S. Application Data

(63) Continuation of application No. 14/285,180, filed on May 22, 2014, now Pat. No. 9,392,459.
(Continued)

(51) Int. Cl.
*H04L 29/06* (2006.01)
*H04W 4/70* (2018.01)
(Continued)

(52) U.S. Cl.
CPC ...... *H04L 63/0876* (2013.01); *H04L 61/1511* (2013.01); *H04L 61/2007* (2013.01);
(Continued)

(58) Field of Classification Search
CPC ..... H04W 12/06; H04W 12/04; H04W 4/005; H04L 63/08
See application file for complete search history.

(56) References Cited

U.S. PATENT DOCUMENTS 9,202,055 B2  12/2015  Yegin et al.
9,258,705 B2  2/2016  Kang et al.
(Continued)

FOREIGN PATENT DOCUMENTS

CN  101455053 A  6/2009
EP  1713204 A1  10/2006
(Continued)

OTHER PUBLICATIONS

Japanese Application No. 2016-515095: Notice of Reasons for Rejection dated Nov. 28, 2016, 5 pages.
(Continued)

*Primary Examiner* — Kathy W Wang-Hurst
*Assistant Examiner* — Ernest G Tacsik
(74) *Attorney, Agent, or Firm* — BakerHostetler

(57) ABSTRACT

The Generic Bootstrapping Architecture is used in a method for assigning the bootstrapping transaction ID so that a machine-to-machine server or other device can locate and communicate with a bootstrapping server function. The bootstrapping server function assigns the bootstrapping transaction ID and updates a DNS server with an entry that maps the bootstrapping transaction ID to a network node IP Address.

15 Claims, 9 Drawing Sheets

Related U.S. Application Data

(60) Provisional application No. 61/826,176, filed on May 22, 2013.

(51) Int. Cl.
    *H04L 29/08* (2006.01)
    *H04W 12/06* (2009.01)
    *H04W 12/04* (2009.01)
    *H04L 29/12* (2006.01)

(52) U.S. Cl.
    CPC ........ *H04L 63/0428* (2013.01); *H04L 63/061* (2013.01); *H04L 63/083* (2013.01); *H04L 63/164* (2013.01); *H04L 67/34* (2013.01); *H04W 4/70* (2018.02); *H04W 12/04* (2013.01); *H04W 12/06* (2013.01)

(56) References Cited

U.S. PATENT DOCUMENTS

| | | | |
|---|---|---|---|
| 9,317,688 | B2 | 4/2016 | Yegin et al. |
| 9,450,928 | B2 | 9/2016 | Broustis et al. |
| 2007/0124587 | A1 | 5/2007 | Krishnamurthi et al. |
| 2008/0016230 | A1* | 1/2008 | Holtmanns ............. H04L 63/08 709/229 |
| 2008/0072057 | A1 | 3/2008 | Zhang et al. |
| 2008/0175237 | A1 | 7/2008 | Kim |
| 2011/0004747 | A1 | 1/2011 | Venkatachalam |
| 2011/0188508 | A1 | 8/2011 | Hjelm et al. |
| 2011/0271117 | A1 | 11/2011 | Qiang |
| 2011/0307694 | A1 | 12/2011 | Broustis et al. |
| 2012/0254959 | A1 | 10/2012 | Schmidt et al. |
| 2012/0266223 | A1 | 10/2012 | Yegin et al. |
| 2012/0284785 | A1* | 11/2012 | Salkintzis ............... G06F 21/43 726/7 |
| 2013/0003972 | A1 | 1/2013 | Kang et al. |
| 2013/0102308 | A1 | 4/2013 | Patil et al. |
| 2013/0124685 | A1 | 5/2013 | Keitel |
| 2014/0052984 | A1* | 2/2014 | Gupta ................... H04W 12/06 713/162 |
| 2014/0286237 | A1* | 9/2014 | Bhalla ................... H04W 4/005 370/328 |
| 2014/0349614 | A1 | 11/2014 | Starsinic et al. |
| 2014/0351592 | A1 | 11/2014 | Starsinic et al. |
| 2015/0230063 | A1 | 8/2015 | Chandramouli et al. |

FOREIGN PATENT DOCUMENTS

| | | |
|---|---|---|
| JP | 2007-535047 A | 11/2007 |
| JP | 2012-505436 | 3/2012 |
| WO | WO 2012-077999 | 6/2012 |
| WO | 2012/094879 A1 | 7/2012 |
| WO | 2012/103954 A1 | 8/2012 |
| WO | 2013/064509 A1 | 5/2013 |
| WO | WO 2014-190177 | 11/2014 |
| WO | WO 2014-190186 | 11/2014 |

OTHER PUBLICATIONS

3rd Generation Partnership Project; (3GPP) TR 21.905 V11.3.0, 3rd Generation Partnership Project; Technical Specification Group Services and System Aspects; Vocabulary for 3GPP Specifications, (Release 11) Dec. 2012, 64 pages.

3rd Generation Partnership Project; (3GPP) TR 23.887, V0.6.0 Technical Specification Group Services and System Aspects; Machine-Type and other Mobile Data Applications Communications Enhancements, (Release 12) Dec. 2012, 95 pages.

3rd Generation Partnership Project; (3GPP) TS 22.368 v12.2.0, 3rd Generation Partnership Project; Technical Specification Group Services and System Aspects; Service Requirements for Machine Type Communications (MTC); Stage 1 (Release 12), Mar. 2013, 24 pages.

3rd Generation Partnership Project; (3GPP) TS 23.003, Technical Specification Group Core Network and Terminals; Numbering addressing and identification, (Release 11) Dec. 2012, 83 pages.

3rd Generation Partnership Project; (3GPP) TS 23.008 v11.7.0, 3rd Generation Partnership Project; Technical Specification Group Core Network and Terminals; Organization of Subscriber Data, (Release 11), Mar. 2013, 110 pages.

3rd Generation Partnership Project; (3GPP) TS 23.040 V11.5.0, 3rd Generation Partnership Project; Technical Specification Group Core Network and Terminals; Technical Realization of Shor t Message Service (SMS), (Release 11), Mar. 2013, 206 pages.

3rd Generation Partnership Project; (3GPP) TS 23.060 v12.0.0, 3rd Generation Partnership Project; Technical Specification Group Services and System Aspects; General Packet Radio Service (GPRS), Service Description; Stage 2, (Release 12), Mar. 2013, 338 pages.

3rd Generation Partnership Project; (3GPP) TS 23.401 v12.0.0, 3rd Generation Partnership Project; Technical Specification Group Services and System Aspects; General Packet Radio Service (GPRS) Enhancements for Evolved Universal Terrestrial Radio Access Network (E-UTRAN) access, (Release 12), Mar. 2013, 290 pages.

3rd Generation Partnership Project; (3GPP) TS 23.682 v11.3.0, 3rd Generation Partnership Project; Technical Specification Group Services and System Aspects; Architecture Enhancements to Facilitate Communications With Packet Data Networks and Applications, (Release 11), Dec. 2012, 29 pages.

3rd Generation Partnership Project; (3GPP) TS 24.008 v10.10.0, 3rd Generation Partnership Project; Technical Specification Group Core Network and Terminals; Mobile Radio Interface Layer 3 Specification; Core Network Protocols; Stage 3 (Release 10), Mar. 2013, 679 pages.

3rd Generation Partnership Project; (3GPP) TS 24.301 v11.6.0, 3rd Generation Partnership Project; Technical Specification Group Core Network and Terminals; Non-access-stratum (NAS) protocol for Evolved Pack System (EPS); Stage 3, (Release 11), Mar. 2013, 312 pages.

3rd Generation Partnership Project; (3GPP) TS 29.002 v11.6.0, Technical Specification Group Core Network and Terminals; Mobile Application Part (MAP) Specification (Release 11), Mar. 2013, 1013 pages.

3rd Generation Partnership Project; (3GPP) TS 29.109 v11.3.0, 3rd Generation Partnership Project; Technical Specification Group Core Network and Terminals; Generic Authentication Architecture (GAA); Zn and Zh Interfaces Based on the Diameter Protocol; Stage 3 (Release 11), Mar. 2013, 69 pages.

3rd Generation Partnership Project; (3GPP) TS 29.329, V11.5.0, 3rd Generation Partnership Project; Technical Specification Group Core Network and Terminals; Sh Interface Based on the Diameter Protocol; Protocol details (Release 11), Dec. 2012, 22 pages.

3rd Generation Partnership Project; (3GPP) TS 29.336, V11.1.0, 3rd Generation Partnership Project; Technical Specification Group Core Network and Terminals; Home Subscriber Server (HSS) Diameter Interfaces for Interworking with Packet Data Networks and Applications, (Release 11) Dec. 2012, 21 pages.

3rd Generation Partnership Project; (3GPP) TS 29.337 v11.2.0, 3rd Generation Partnership Project; Technical Specification Group Core Network and Terminals; Diameter-based T4 Interface for Communications With Packet Data Networks and Applications (Release 11), Mar. 2013, 18 pages.

3rd Generation Partnership Project; (3GPP) TS 29.368, V11.1.0, Tsp Interface Protocol Between the MTC Interworking Function (MTC-IWF) and Service Capability Server (SCS), Dec. 2012, 21 pages.

3rd Generation Partnership Project; (3GPP) TS 33.210 v12.2.0, 3rd Generation Partnership Project; Technical Specification Group Services and System Aspects; 3G Security; Network Domain Security (NDS); IP Network Layer Security (Release 12), Dec. 2012, 24 pages.

3rd Generation Partnership Project; (3GPP) TS 33.220, V11.4.0, 3rd Generation Partnership Project; Technical Specification Group Services and System Aspects; Generic Authentication Architecture (GAA); Generic Bootstrapping Architecture (GBA), Sep. 2012, 92 pages.

(56) References Cited

OTHER PUBLICATIONS

3rd Generation Partnership Project; (3GPP) TS 33.310 v11.2.0, 3rd Generation Partnership Project; Technical Specification Group Services and System Aspects; Network Domain Security (NOS); Authentication Framework (AF) (Release 11), Dec. 2012, 54 pages.
3rd Generation Partnership Project; (3GPP) TS 33.402, V11.4.0, 3rd Generation Partnership Project; Technical Specification Group Services and System Aspects; 3GPP System Architecture Evolution (SAE); Security Aspects of non-3GPP accesses, (Release 11) Jun. 2012, 52 pages.
3rd Generation Partnership Project; (3GPP); TS 22.011 v12.0.0, 3rd Generation Partnership Project; Technical Specification Group Services and System Aspects; Service accessibility, (Release 12) Mar. 2013, 26 pages.
Aboba et al, "Extensible Authentication Protocol (EAP)", Network Working Group, Jun. 2004, 68 pages.
Arkko et al, "Improved Extensible Authentication Protocol Method for 3rd Generation Authentication and Key Agreement (EAP-AKA')", The Internet Engineering Task Force (IETF), RFC 5488, May 2009, 29 pages.
Arkko, J. and Haverinen, H., "Extensible Authentication Protocol Method for 3rd Generation Authentication and Key Agreement (EAP-AKA)", Networking Group, RFC 4187, Jan. 2006, 79 pages.
Calhoun et al, "Diameter Base Protocol", The Internet Engineering Task Force (IETF) RFC 3588, Sep. 2003, 138 pages.
Crocker D. and Overell, P., "Augmented BNF for Syntax Specifications: ABNF", The Internet Engineering Task Force (IETF) RFC 2234, Nov. 1997, 14 pages.
Dierks, T. and Rescorla, E., "Transport Layer Security (TLS) Protocol Version 1.1" The Internet Engineering Task Force (IETF), RFC 4346, Apr. 2006, 82 pages.
ETSI TS 102 690 V1.1.1 "Machine-to-MachineCommunications (M2M)"; Functional Architecture, Oct. 2011, 280 pages.
ETSI TS 102 921 V1.1.1, "Machine-to-Machine Communications (M2M) mia, dia and mid Interfaces", Feb. 2012, 250 pages.
Forsberg et al, "Protocol for Carrying Authentication for Network Access (PANA)", IETF RFC 5191, May 2008, 46 pages.
Franks et al, "HTTP Authentication: Basic and Digest Authentication", Network Working Group, RFC 2617, Jun. 1999, 32 pages.
Hakala et al, "Diameter Credit-Control Application", Networking Group, RFC 4006, Aug. 2005, 107 pages.
International Patent Application No. PCT/US14/39205: International Preliminary Report on Patentability dated May 20, 2015, 16 pages.
International Patent Application No. PCT/US2014/039188: International Search Report and Written Opinion dated Sep. 26, 2014, 9 pages.
International Patent Application No. PCT/US2014/039205: International Search Report and Written Opinion dated Sep. 26, 2014, 11 pages.
Niemi et al, "HTTP Digest Authentication Using AKA", Network Working Group, RFC 3310, Sep. 2002, 17 pages.
Romascanu,D. and Tschofenig, H., "Updated IANA Considerations for Diameter Command Code Allocations", Internet Engineering Task Force (IETF) RFC 5719, Jan. 2010, 5 pages.
Japanese Patent Application No. 2016-515092: Notice of Reasons for Rejection dated Dec. 16, 2016, 9 pages.
$3^{rd}$ Generation Partnership Project; (3GPP) TS 33.220 V12.0.0, 3rd Generation Partnership Project; Technical Specification Group Services and System Aspects; Generic Authenitication Architecture (GAA); Generic Bootstrapping Architecture (GBA) (Release 12) Mar. 2013, 20 pages.

* cited by examiner

PRIOR ART

ACCESS NETWORK ASSISTED BOOTSTRAPPING

CROSS-REFERENCE TO RELATED APPLICATIONS

This application is a continuation of U.S. patent application Ser. No. 14/285,180, filed May 22, 2014, entitled "Access Network Assisted Bootstrapping," which claims the benefit of priority of U.S. Provisional Patent Application No. 61/826,176, filed on May 22, 2013, entitled "ACCESS NETWORK ASSISTED BOOTSTRAPPING." The contents of U.S. patent application Ser. No. 14/285,180 and 61/826,176 are hereby incorporated by reference herein in their entirety.

BACKGROUND

Machine-to-machine (M2M) technologies allow devices to communicate more directly with each other using wired and wireless communications systems. M2M technologies enable further realization of the Internet of Things (IoT), a system of uniquely identifiable objects and virtual representations of such objects that communicate with each other over a network, such as the Internet. IoT may facilitate communication with even mundane everyday objects, such as products in a grocery store or appliances in a home, and thereby reduce costs and waste by improving knowledge of such objects. For example, stores may maintain very precise inventory data by being able to communicate with, or obtain data from, objects that may be in inventory or may have been sold.

Several efforts have been undertaken to develop standardized architectures for machine-to-machine communication. These include 3rd Generation Partnership Project (3GPP) Machine Type Communication (MTC) architecture, the ETSI M2M architecture, and the oneM2M architecture. These architectures are summarized briefly below.

The 3GPP evolved packet core (EPC) network was not originally designed in a way that is optimized for handling machine-to-machine (M2M) communications, also referred to as machine type communications (MTC), in which machines, or devices, communicate with each other over the network, such as communications involving smart metering, home automation, eHealth, consumer products, fleet management, etc. Thus, in Release 11 (R11) of the 3GPP specifications, 3GPP enhanced the interworking capabilities of the UMTS core network for machine type communications/machine-to-machine communications. Interworking refers to a server, or application, interfacing to the core network for the purposes of exchanging information, controlling devices, or monitoring devices, or communicating with devices. FIG. 1 shows portions of the MTC architecture that is presented by 3GPP in TS 23.682 V11.5.0.

As shown in FIG. 1, user equipment 214 may connect to the EPC over a radio access network (RAN) 219, which may comprise E-UTRAN (LTE access network). The Evolved NodeB (eNodeB) is the base station for LTE radio. In this figure, the EPC comprises a number of network elements, including Serving Gateway (Serving GW) 210, Packet Data Network Gateway (PDN GW or P-GW) 253, mobility management entity (MME) 212 and Home Subscriber Server (HSS) 257.

HSS 257 is a database that contains user-related and subscriber-related information. It also provides support functions in mobility management, call and session setup, user authentication and access authorization.

The gateways (S-GW 210 and P-GW 252) deal with the user plane. They transport IP data traffic between User Equipment (UE) 214 and an external network(s). S-GW 210 is the point of interconnect between the radio-side and the EPC. As its name indicates, this gateway serves the UE by routing incoming and outgoing IP packets. It is the anchor point for intra-LTE mobility (i.e., in case of handover between eNodeBs in RAN 219) and between LTE and other 3GPP accesses. It is logically connected to the other gateway, the P-GW 253.

P-GW 253 is the point of interconnect between the EPC and external IP networks, such as the Internet. These networks are called PDNs (Packet Data Networks), hence the name. P-GW 253 routes packets to and from the PDNs. P-GW 253 also performs various functions such as IP address/IP prefix allocation or policy control and charging. 3GPP specifies these gateways operate independently but in practice they may be combined in a single "box" by network vendors.

MME 212 deals with the control plane. It handles the signaling related to mobility and security for E-UTRAN access. MME 212 is responsible for the tracking and the paging of UEs in idle-mode. It is also the termination point of the Non-Access Stratum (NAS).

As mentioned above, UE 214 can reach the EPC using E-UTRAN, however this is not the only access technology supported. 3GPP specifies support of multiple access technologies and also the handover between these accesses. The idea is to bring convergence using a unique core network providing various IP-based services over multiple access technologies. Existing 3GPP radio access networks are supported. 3GPP specifications define how interworking is achieved between an E-UTRAN (LTE and LTE-Advanced), GERAN (radio access network of GSM/GPRS) and UTRAN (radio access network of UMTS-based technologies WCDMA and HSPA).

The architecture also allows non-3GPP technologies to interconnect the UE and the EPC. Non-3GPP means that these accesses were not specified in 3GPP. These technologies include, for example, WiMAX, cdma2000®, WLAN or fixed networks. Non-3GPP accesses can be split into two categories: the "trusted" ones and the "untrusted". Trusted non-3GPP accesses can interact directly with the EPC. Untrusted non-3GPP accesses interwork with the EPC via a network entity called the ePDG (for Evolved Packet Data Gateway) (not shown). The main role of the ePDG is to provide security mechanisms such as IPsec tunneling of connections with the UE over an untrusted non-3GPP access. 3GPP does not specify which non-3GPP technologies should be considered trusted or untrusted. This decision is made by the operator.

As further illustrated in FIG. 1, a service capability server (SCS) 161 may provide services to the core network, devices, and applications. The SCS may also be called an M2M Server, MTC Server, a Service Capability Layer (SCL), or a Common Services Entity (CSE). An SCS 261 may be controlled by the operator of the home public land mobile network (HPLMN) or by an MTC service provider. An SCS may be deployed inside or outside the operator domain. If an SCS is deployed inside the operator domain, the SCS may be an internal network function and may be controlled by the operator. If an SCS is deployed outside the operator domain, the SCS may be controlled by a MTC service provider.

In the MTC architecture of FIG. 1, SCS 261 may communicate with machine type communication (MTC) interworking function (MTC-IWF) 259 via a Tsp reference point (i.e., interface) 208. The Tsp reference point is an example of an interface that is used for interworking with the core network.

A UE may communicate through the public land mobile network (PLMN), which includes radio access network (RAN) 219, with SCS(s) and/or other MTC UE(s). An MTC UE 214 may host one or more MTC applications 216. The MTC applications may also be hosted on one or more application servers (AS) (e.g., AS 220). The MTC application 216 may be a MTC communication endpoint that may interact with SCS 261, AS MTC applications, or other UE MTC applications.

An application server (AS) (e.g. AS 220) may also host one or more MTC applications. The AS 220 may interface with the SCS 161, and the SCS 261 may provide services to an application(s) running on the AS 220. The MTC applications on an AS may interact with SCSs, UE MTC applications, or other MTC applications.

The MTC inter working function (MTC-IWF) 159 hides the internal PLMN topology from the SCS 261. The MTC-IWF may relay and/or translate signaling protocols used between itself and the SCS (e.g., over the Tsp reference point 208) to support MTC functionality (e.g., MTC UE triggering) in the PLMN. For example, the SCS may request that the MTC-IWF send a trigger to a MTC device. The MTC-IWF may deliver the MTC trigger to the MTC device 214 via SMS (not shown), for example. The MTC device 216, based on the trigger, may respond to the SCS 212. The MTC device 214 may, for example, respond with a sensor reading. When the MTC device 214 responds to the SCS 212, the MTC device may use a packet data network (PDN)/packet data protocol (PDP) connection, via P-GW 253, to communicate with the SCS 261. The MTC device may connect with the SCS using an IP connection.

The MTC-IWF 259 may authorize the SCS 261, before the SCS may establish communication with the 3GPP network. For example, when the SCS 259 makes a trigger request on the Tsp reference point, the MTC-IWF 259 may check whether the SCS is authorized to send the trigger request and that the SCS has not exceeded its quota or rate of trigger submissions.

The ETSI M2M architecture is illustrated in FIG. 2. In the ETSI M2M architecture, a service capability layer (SCL) uses core network functionalities through a set of exposed interfaces to provide service capabilities to the network. An SCL may interface to one or several different core networks.

In the ETSI M2M architecture, the network comprises M2M devices (e.g., device 145), M2M gateways (e.g., gateway 140), and M2M servers (e.g., M2M server 125). A device application (DA) may be executing on an M2M device, a gateway application (GA) may be executing on an M2M gateway, and a network application (NA) may be executing on an M2M server. As further shown, a device (e.g. device 145) may implement M2M service capabilities using a device service capabilities layer (DSCL) (e.g., DSCL 146), a gateway may implement a gateway SCL (GSCL 141), and a server may implement a network SCL (NSCL) (e.g., NSCL 126).

The mIa reference point allows a network application to access the M2M service capabilities in an M2M server.

The dIa reference point allows a device application residing in an M2M device to access the different M2M service capabilities in the same M2M device or in an M2M gateway; and allows a gateway application residing in an M2M gateway to access the different M2M service capabilities in the same M2M gateway.

The mId reference point allows M2M service capabilities layer residing in an M2M device or M2M gateway to communicate with the M2M service capabilities layer in the network. The mId reference point uses core network connectivity functions as an underlying layer.

Further according to the ETSI M2M architecture, an M2M entity (e.g., an M2M functional entity such as a device, gateway, or server/platform that may be implemented by a combination of hardware and/or software) may provide an application or service. For example, a light sensor may provide data indicating detected light levels or a thermostat may provide temperature data and the ability to adjust air conditioning controls. This data may be made available as a "resource" that may be accessed by other M2M entities and that essentially serves as a means to exchange data between M2M entities. A resource may be a uniquely addressable representation of data that may be addressed using a Universal Resource Indicator (URI) or Universal Resource Locator (URL). The availability of such resources may be communicated among M2M entities via the M2M service capabilities layer (SCL).

The M2M SCL is also a functional entity that may be implemented using a combination of hardware and software and provides functions exposed on the reference points (i.e., functional interfaces between M2M entities) mentioned above. For example, the M2M SCL may provide common (service) functionalities that are shared or commonly used by different M2M applications and/or services. M2M service capabilities may use functions and capabilities of the 3GPP core network architecture through a set of exposed interfaces (e.g., existing interfaces specified by 3GPP, 3GPP2, ETSI TISPAN, etc.) and may also interface to one or more other core networks. M2M devices and entities are typically organized into M2M network domains. In many implementations, an M2M server (e.g., M2M server 125) configured with a network SCL entity (NSCL) may maintain resources and resource data for use by other devices (e.g., other M2M devices and M2M gateways) in the same M2M network domain.

Still referring to FIG. 2, NSCL 126 may be in network domain 122 and configured with network application (NA) 127 at M2M server platform 125. NA 127 and NSCL 126 may communicate via reference point mIa 128. The mIa reference points may allow an NA to access the M2M service capabilities available from an NSCL in an M2M domain. Also within network domain 122 may be GSCL 141 and gateway application (GA) 142 that may be configured at M2M gateway device 140. GSCL 141 and GA 142 may communicate using reference point dIa 143. Also within network domain 122 may be DSCL 146 and device application (DA) 147 that may be configured at M2M device 145. DSCL 146 and DA 147 may communicate using reference point dIa 148. Each of GSCL 141 and DSCL 146 may communicate with NSCL 126 using reference point mId 124. In general, dIa reference points allow device and gateway applications to communicate with their respective local service capabilities (i.e., service capabilities available at a DSCL and a GSCL, respectively). The mId reference point allows an M2M SCL residing in an M2M device (e.g., DSCL 146) or an M2M gateway (e.g., GSCL 141) to communicate with the M2M service capabilities in the network domain and vice versa (e.g., NSCL 126).

Typically, the device 145, gateway 140, and M2M server platform 125 comprise computing devices, such as the devices illustrated in FIG. 6C and FIG. 6D and described below. The NSCL, DSCL, GSCL, NA, GA, and DA entities typically are logical entities that are implemented in the form of software, executing on the underlying device or platform, to perform their respective functions in the system 120. The M2M server 125 of the ETSI M2M architecture may be an SCS (e.g. SCS 261 of FIG. 1) in the 3GPP MTC architecture.

As further shown in FIG. 2, NSCL 131 may be in domain 130 with NA 132. NA 132 and NSCL 131 may communicate via mIa reference point 133. There may be an NSCL 136 in network domain 135, and NSCL 139 in network domain 138. mIm reference point 123 may be an inter-domain reference point that allows M2M network nodes in different network domains, such as NSCL 126 in network domain 122, NSCL 131 in network domain 130, NSCL 136 in network domain 135, or NSCL 139 in network domain 138, to communicate with one another. For simplicity herein, the term "M2M server" may be used to indicate a service capability server (SCS), NSCL, application server, NA, or an MTC server. In addition, the term user equipment (UE), as discussed herein, may apply to GA, GSCL, DA, or DSCL. A UE may comprise any wireless device capable of communicating in a 3GPP or other wireless network, such as an M2M or MTC device or gateway, and including for example, machines, sensors, appliances, or the like, a mobile station, a fixed or mobile subscriber unit, a pager, a personal digital assistant (PDA), a computer, a mobile phone or smart phone, or any other type of device capable of operating in a wired or wireless environment.

One process that is often performed in an M2M system is called bootstrapping. Bootstrapping is a process by which entities (e.g., an end-user device and server) perform mutual authentication and key agreement to establish a relationship enabling secure communications between them. Mutual authentication is a procedure in which each party proves its identity to the other. For example, if the Generic Bootstrapping Architecture (GBA) is used, authentication may be achieved by making a network component challenge the subscriber identity module (SIM) card of the end-user device and verify that the answer is identical to the one predicted by a home location register (HLR) or home subscriber server (HSS). Authentication helps prevent a rogue device from registering with a server by pretending it is a legitimate end-user device. Authentication also helps prevent a fraudulent server from performing a man-in-the-middle attack, which may consist of the fraudulent server establishing a connection with an end-user device by pretending that it is a legitimate server.

Key agreement is a procedure in which the communicating entities derive a security key that they can then use to secure communications between them, for example, by an encryption process that uses the security key. A feature of a key agreement mechanism is that the key is not transmitted. The key derivation function may be based on a shared secret value that is meant for only an end-user device and server to know, for example. This shared secret is also not transmitted. The key derivation function is designed such that it is prohibitively computationally complex for an eavesdropper, who does not know the shared secret, to compute the key by observing the messages that are transmitted during the key agreement procedure. An overview of some authentication and key agreement mechanisms, such as HTTP 1.0, HTTP Digest Authentication, and General Bootstrapping Architecture (GBA), are discussed to give further context to disclosed embodiments.

According to RFC 2617, "HTTP 1.0 includes a basic access authentication scheme. The scheme is not considered to be a secure method of user authentication, as the user name and password are passed over the network in an unencrypted form." In addition, RFC 2617 defines an HTTP Digest Authentication Scheme. The digest scheme is similar to the basic HTTP 1.0 authentication scheme because both are based on a simple challenge-response paradigm. However, the digest scheme uses a nonce value. Each challenge issued by the server contains a uniquely generated nonce value. The client response never includes the password, but instead it includes a checksum or hash of the username, the password, the given nonce value, the HTTP method, and the requested URI. Just like basic authentication, this scheme still requires the password be prearranged between the user and server. However, the checksum is defined such that the password cannot be derived without an unreasonable amount of computation.

RFC 3310 defines a method for using the universal mobile telecommunication system (UMTS) authentication and key agreement (AKA) protocol as a one-time password generation mechanism for HTTP Digest Authentication. The approach that is proposed in RFC 3310 removes the need for the user equipment (UE) Application and the network application to use a pre-arranged password. Instead, the universal subscriber identity module (USIM) and home subscriber server (HSS) are leveraged to authenticate the UE, authenticate the network application, and establish encryption keys.

3GPP TS 33.220, defines the Generic Bootstrap Architecture (GBA). The GBA allows UE applications and network application functions (NAF's) to leverage the 3GPP AKA protocol for device bootstrapping. The GBA is an architecture that HTTP Digest can leverage to implement the HTTP Digest AKA protocol defined in RFC 3310. ETSI 102 690, Section 8.3.2.1, proposes that the GBA be used to implement HTTP Digest Authentication using the AKA protocol as defined in RFC 3310.

SUMMARY

Bootstrapping can be an expensive process in that it often requires that secret keys or certificates be provisioned in a device in order to achieve the desired level of security. This is a particularly important problem in the machine-to-machine field because of the large number of devices that are required to bootstrap with an SCS, or M2M server. Disclosed herein are methods, devices, and systems for access network assisted bootstrapping. For example, the service layer may leverage the access network infrastructure so that device or gateway service capability layers (D/GSCLs) may bootstrap with the M2M server without requiring provisioning beyond what is already required by the access network. Particularly in an embodiment, access network subscription information is added to the HSS to support the authorization of service layer bootstrapping.

In another embodiment, for the Generic Bootstrapping Architecture (GBA), a method is defined for assigning the bootstrapping transaction ID (B-TID) so that an SCS can locate and communicate with the bootstrapping server function (BSF) of the GBA. The BSF assigns the B-TID and updates a DNS server with an entry that maps the B-TID to a machine type communication inter-working function (MTC-IWF) IP Address. The SCS may use this mapping to locate an MTC-IWF that may be used to reach the BSF. In another embodiment, Zn interface commands are placed with the Tsp interface, while some of the BSF functionality is moved into the MTC-IWF.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to limitations that solve any or all disadvantages noted in any part of this disclosure.

BRIEF DESCRIPTION OF THE DRAWINGS

A more detailed understanding may be had from the following description, given by way of example in conjunction with the accompanying drawings wherein.

DETAILED DESCRIPTION OF ILLUSTRATIVE EMBODIMENTS

Discussed with further detail herein are multiple concepts with regard to bootstrapping. As described in relation to the GBA architecture, a method is disclosed for assigning the bootstrapping transaction ID (B-TID) so that a M2M server may locate and communicate with the bootstrapping server function (BSF) of the GBA. The BSF assigns the B-TID and updates a DNS server with an entry that maps the B-TID to a machine type communication inter-working function (MTC-IWF) IP Address. The M2M server uses this mapping to locate an MTC-IWF that may be used to reach the BSF.

By way of further background, 3GPP TS 33.220, defines the Generic Bootstrap Architecture (GBA). The GBA allows UE applications and network application functions (NAFs) to leverage the 3GPP AKA protocol for device bootstrapping. The GBA is an architecture that HTTP Digest can leverage to implement the HTTP Digest AKA protocol defined in RFC 3310. ETSI TS 102 690, Section 8.3.2.1, proposes that the GBA be used to implement HTTP Digest Authentication using the AKA protocol as defined in RFC 3310. GBA was defined for generic network applications; it was not designed to work with specific service layers.

As still further background, the ETSI M2M Architecture Specification (TS 102 690) supports access network assisted bootstrapping methods. These approaches generally allow the service layer to be more lightweight. In Section 8.3.2 of the ETSI M2M Architecture Specification, three approaches are discussed that leverage the capabilities of the access network in order to simplify the process of bootstrapping at the service layer. One of the approaches is a GBA approach. The GBA approach requires an interface from the M2M Server (NSCL) to the access network, which is not completely defined by ETSI M2M.

Figure 1:
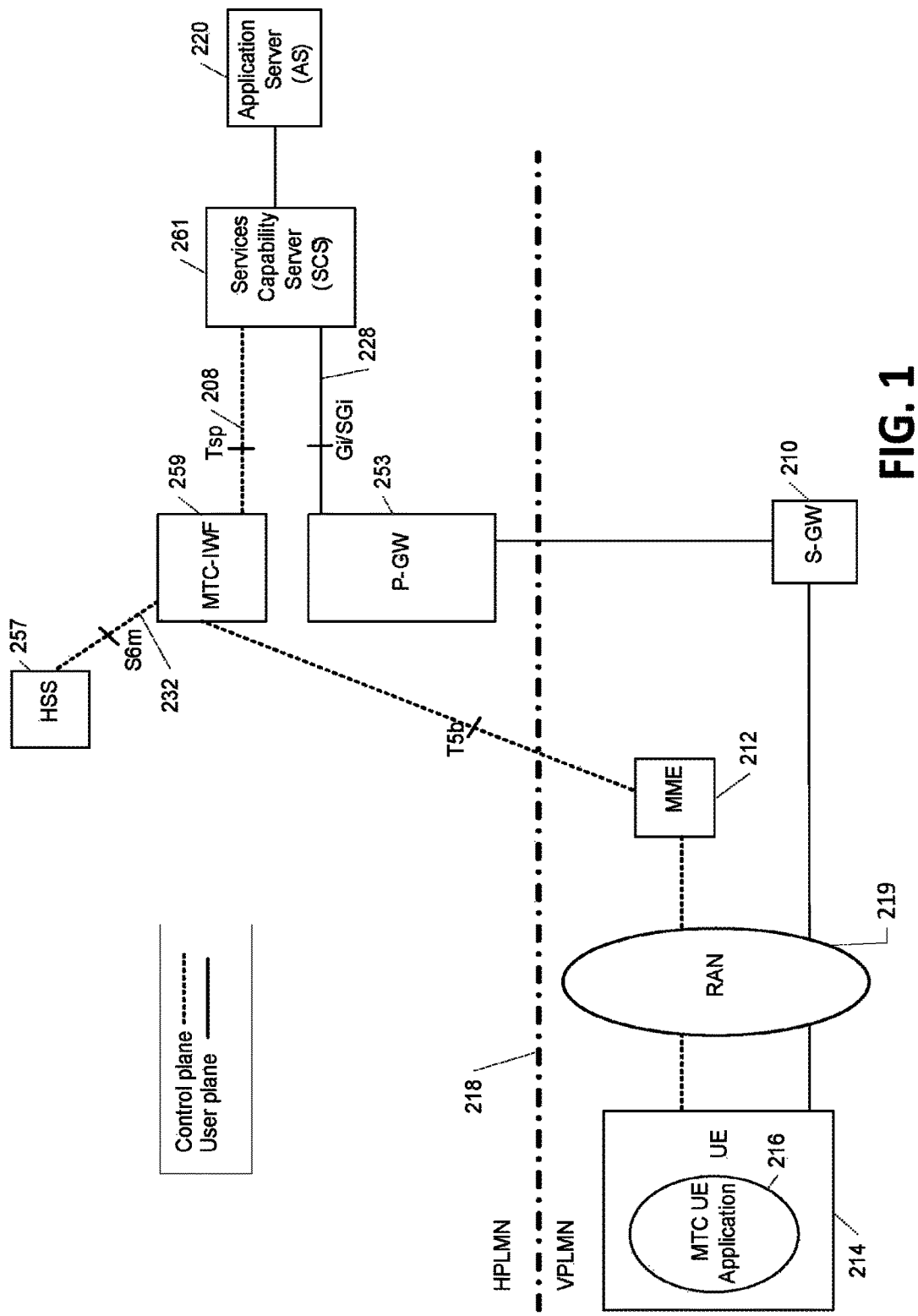
FIG. 1 is a block diagram illustrating the 3GPP Machine Type Communication (MTC) architecture.
Figure 2:
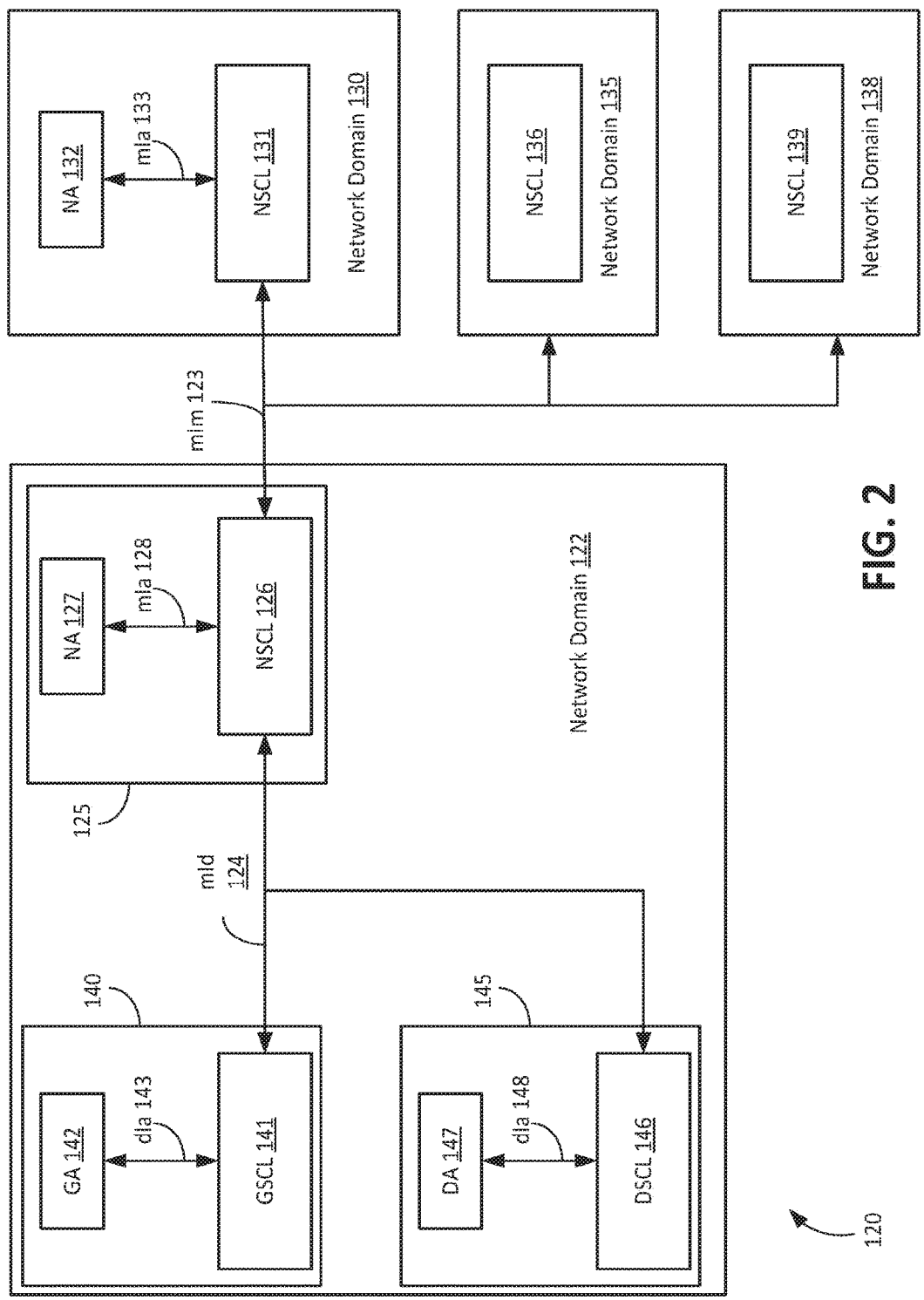
FIG. 2 is a block diagram illustrating the ETSI M2M architecture.
Figure 3:
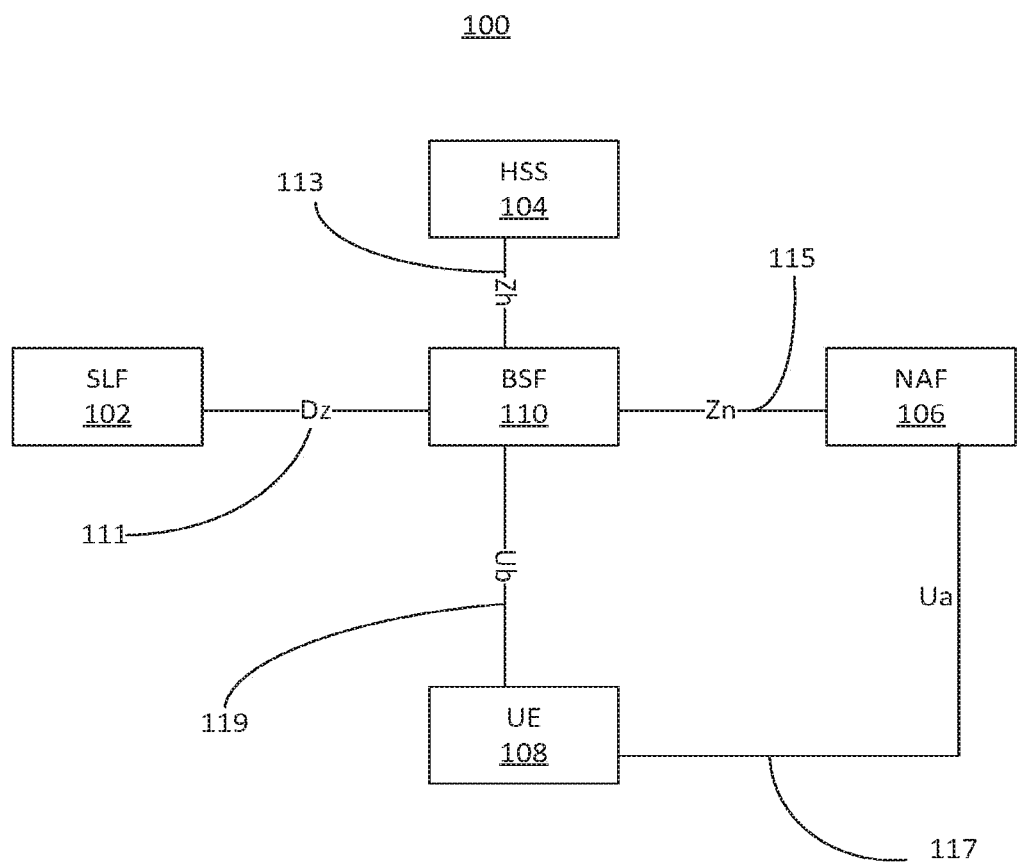
FIG. 3 illustrates the generic bootstrap architecture (GBA)

FIG. 3 illustrates the GBA architecture 100. As shown, reference point Dz 111 is used between a Subscriber Locator Function (SLF) 102 and bootstrapping server function (BSF) 110. Reference point Zh 113 is used between home subscriber server (HSS) 104 and BSF 110. Zh 113 is the BSF-HSS interface for the bootstrapping procedure. Reference point Zn 115 is used between a network application function (NAF) 106 and BSF 110. Zn 115 is the BSF-NAF interface for Generic Authentication Architecture (GAA) applications. Reference point Ua 117 is used between NAF 106 and UE 108. Ua is the UE-NAF interface for GAA applications. Reference point Ub 119 is used between UE 108 and BSF 110. Ub 119 is the UE-BSF interface for bootstrapping. The Ua, Ub, Zn, and Zh reference points are further defined in 3GPP TS 29.109.

As previously defined in GBA, when UE 108 bootstraps with NAF 106, UE 108 identifies itself with a bootstrapping transaction ID (B-TID). The B-TID is a temporary identifier, assigned by bootstrapping server function (BSF) 110, which BSF 110 may map to a permanent device identifier and an authentication vector. NAF 106 is able to detect the home network of BSF 110 from the B-TID. TS 33.220 lists multiple requirements for the B-TID. For example, B-TID shall be globally unique, B-TID shall be usable as a key identifier in protocols used in reference point Ua 117, and NAF 106 shall be able to detect the home network and BSF 110 of UE 108 from the B-TID.

The definition of the B-TID is found in 3GPP TS 29.109. The definition of this attribute value pair (AVP), called transaction-identifier, is incomplete. The specification simply calls for the AVP to be of type Octet String. As revealed in more detail herein, the fact that the NAF, or SCS, is required to locate the BSF implies additional coordination between the service layer and access network. The B-TID should be formatted such that the identifiers that are already known to the access network and service layer may be leveraged. In the architecture of FIG. 3, it is implied that the BSF 110 will need to authorize NAF 106, confirms that UE 108 and NAF 106 are allowed to bootstrap, and perform some level of identifier mapping. Also, since the access network assists with bootstrapping, additional information may be retained in the subscription information of devices that are allowed to use this feature. As revealed in more detail herein, new access network subscription information is added to the HSS to support the authorization of service layer bootstrapping.

Disclosed below is a method or system for a device or gateway SCL (D/GSCL) to bootstrap with a M2M server (e.g., SCS) using GBA. The disclosed bootstrapping process leverages the core network infrastructure to allow a UE that includes one or more D/GSCLs to perform mutual authentication with an M2M server. In addition, the bootstrapping process leverages the core network infrastructure to derive the service layer root key, Kmr, as part of the bootstrapping process. There may also be integration of the registration process, so that when the bootstrapping process is complete, an SCL will be registered with a M2M server.

Before proceeding, it should be noted that embodiments described herein may be described in terms of a representational state transfer (REST) architecture, with components and entities described conforming to the constraints of a REST architecture (RESTful architecture). A RESTful architecture is described in terms of the constraints applied to components, entities, connectors, and data elements used in the architecture rather than in terms of physical component implementation or communications protocols used. Thus, the roles and functions of the components, entities, connectors, and data elements will be described.

In a RESTful architecture, representations of uniquely addressable resources are transferred between entities. The ETSI M2M specification (e.g., TS 102 921 and TS 102 690 as discussed herein) has standardized the resource structure that resides on an SCL. When handling resources in a RESTful architecture, there are basic methods that may be applied to resources, such as Create (create child resources), Retrieve (read the content of the resource), Update (write the content of the resource) or Delete (delete the resource.) One skilled in the art will recognize that implementations of the instant embodiments may vary while remaining within the scope of the present disclosure. One skilled in the art will also recognize that the disclosed embodiments are not limited to implementations using the ETSI M2M architecture that is described herein to describe exemplary embodiments. The disclosed embodiments may be implemented in other architectures and systems as well, such as oneM2M and other M2M systems and architectures.

Figure 4:
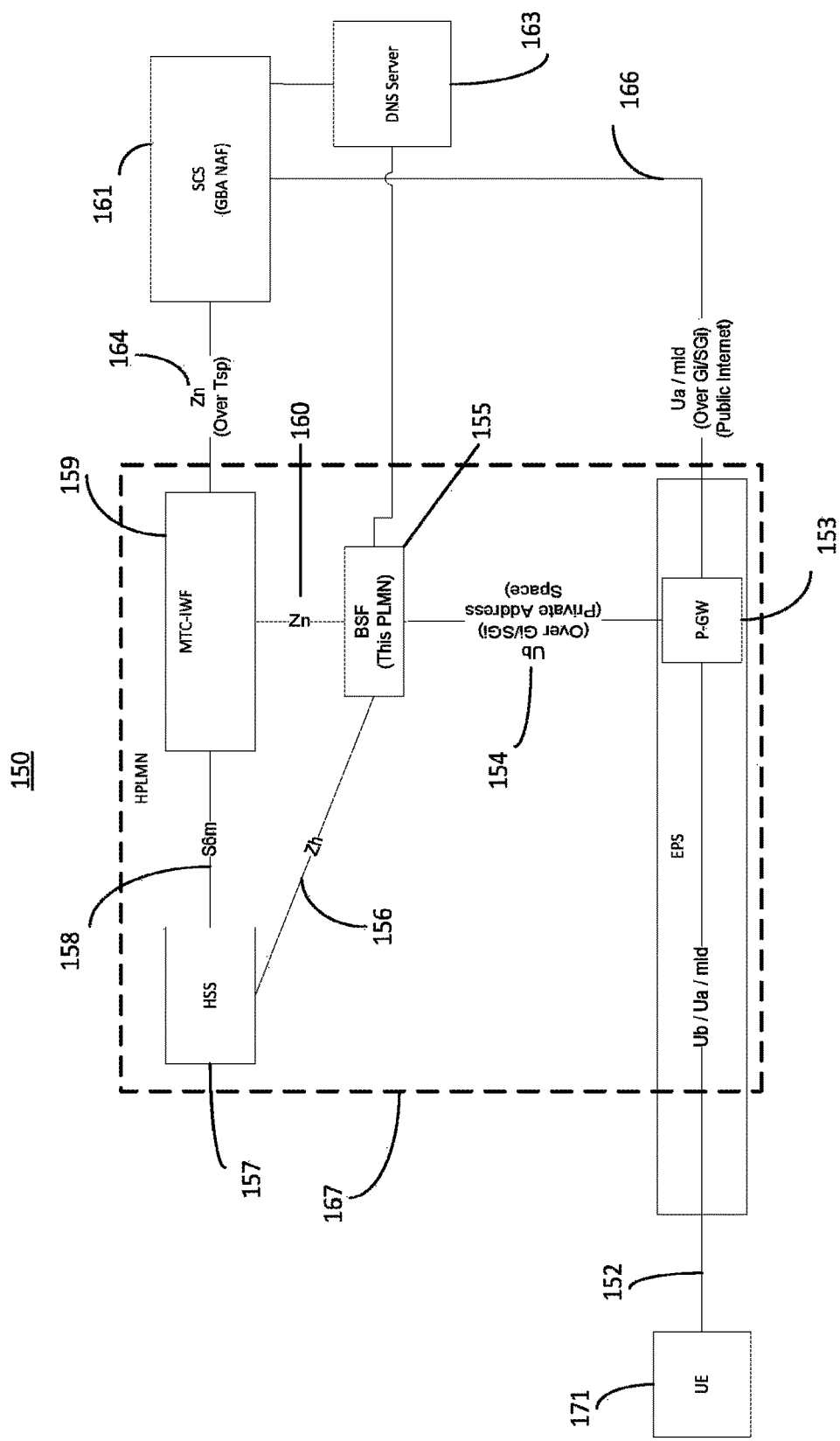
FIG. 4 illustrates the generic bootstrap architecture for MTC.

FIG. 4 illustrates an exemplary M2M system 150 in which the GBA architecture is incorporated to achieve M2M bootstrapping. Home public land mobile network (HPLMN) 167 includes packet gateway (P-GW) 153, BSF 155, HSS 157, and machine type communication inter-working function (MTC-IWF) 159. UE 171 is communicatively connected with HPLMN 167 via the Ub, Ua, and mId reference points 152 which connect with P-GW 153. UE 171 may comprises an M2M device or gateway and may include one or more D/GSCLs. The Ub, Ua, and mId reference points may be used simultaneously. P-GW 153 is communicatively connected with BSF 155 and SCS 161 via reference point Ub 154 and reference point Ua/mId 166. SCS 161 may be seen as including an NAF that is used with GBA. SCS 161 also includes one or more NSCLs. BSF 155 is connected with HSS 157 and MTC-IWF 159 via reference points Zh 156 and Zn 160, respectively. MTC-IWF 159 is communicatively connected with HSS 157 and SCS 161 via reference point S6m 158 and reference point 164, respectively. Zn reference point 164 is over a Tsp reference point. DNS server 163 is communicatively connected with SCS 161 and BSF 155. With regard to the Tsp interface and MTC-IWF, both are defined in 3GPP TS 23.683 (Release 11). As mentioned above, MTC-IWF 159 is a core network node that allows a M2M server (e.g., SCS 161) to interface to the core network and hide the underlying topology of the core network from the M2M server.

If the subscriber information of UE 171 indicates that the GBA architecture and extensions allow it to work with SCS 161, then the core network (HPLMN) allows the SCS 161 to access the BSF 155. A D/GSCL on UE 171 is able to leverage the GBA to bootstrap with SCS 161. Use of the GBA implies that the D/GSCL on UE 171 has a way to discover BSF 155 and that the core network will be able to authorize connections between devices or gateways and SCSs. In accordance with another aspect of the present embodiment, new HSS subscription information fields are defined to support the new bootstrapping process. These new HSS subscription information fields include a BSF name field, a field for "permitted service capability servers" (i.e., the names of SCSs that the device is allowed to connect to), and a "permitted for GBA" field (i.e., a flag that is used to indicate if the device should be provided with the bootstrapping service).

Table 1 lists the reference points that are used to deploy the GBA, as discussed above. 3GPP TS 33.220 defines the Zn reference point such that it directly connects the BSF with the SCS. In FIG. 4, the Zn reference point (Zn 160 and Zn 164) is routed through MTC-IWF 159. By routing the Zn reference point through MTC-IWF 159, BSF 155 will not need to authorize SCS 161 for bootstrapping or authenticate SCS 161. MTC-IWF 159 already authenticates and authorizes SCS 161. This approach simplifies BSF 155. In one embodiment, BSF 155 may be part of HSS 157. In another embodiment, the BSF 155 may be tightly integrated with HSS 157. In other embodiments, BSF 155 may be part of an AAA server (not shown), or tightly integrated with an AAA server. The Zn reference point (i.e., Zn reference point 160 and Zn reference point 164) may be "routed" through MTC-IWF 159 by adding the commands that are currently part of Zn reference point 164 to the Tsp interface.

TABLE 1

GBA Reference Points and Mapping for MTC

| Reference Point Name | Connected Entities | Existing Reference Point | Description | Protocol | 3GPP Reference |
|---|---|---|---|---|---|
| Ub | UE, BSF | Gi/SGi | Provides mutual authentication between the UE and BSF. Allows the UE to establish session keys based on the 3GPP AKA infrastructure. | HTTP or the same protocol as the mId. | 3GPP TS 33.220 Sections 4.3.1, 4.4.4 |
| Ua | UE, SCS | mId, Gi/SGi | Application interface between the UE application and SCS. Secured with the keys that were established on the Ub. | HTTP or the same protocol as the mId. | 3GPP TS 33.220 Sections 4.3.2 |
| Zn | MTC-IWF, | Tsp | Used by the | Diameter | 3GPP TS 33.220 |

TABLE 1-continued

GBA Reference Points and Mapping for MTC

| Reference Point Name | Connected Entities | Existing Reference Point | Description | Protocol | 3GPP Reference |
|---|---|---|---|---|---|
| | SCS, BSF | | NAF/SCS to fetch the keys that were established on the Ub. | | Sections 4.3.4, 4.4.6 |
| Zh | BSF, HSS | New | Allows the BSF to fetch the authentication information. This is an intra-operator domain interface. | Diameter | 3GPP TS 33.220 Sections 4.3.3, 4.4.5 |

In the embodiment illustrated in FIG. 4, BSF 155 is a core network function that the D/GSCL on UE 171 and SCS 161 may use to mutually authenticate. BSF 155 is capable of requesting that HSS 157 run the AKA protocol. The application (which could be a D/GSCL) on UE 171 and BSF 155 communicate over the Ub reference point (e.g., Ub reference point 152 and Ub reference point 154) and agree on session keys that will be applied between the application on UE 171 and SCS 161. The Ub reference point (e.g., Ub reference point 152 and Ub reference point 154) is HTTP based and can be accessed via P-GW 153 in the subscriber's home network (i.e., HPLMN 167). This does not mean that the device cannot roam into a visited network or access BSF 155 from a visited network. It simply means that the selected access point name (APN) maps P-GW 153 in the home network (e.g., HPLMN 167) that can be used to access BSF 155.

In order to contact BSF 155, the D/GSCL on UE 171 uses a contact address for BSF 155. The contact address of BSF 155 may be an IP address that P-GW 153 will use to route traffic to BSF 155. The BSF 155 contact address may be provisioned in the D/GSCL on UE 171 or provided to the D/GSCL on UE 171 by the NSCL on SCS 161. The contact address of BSF 155 will map to the BSF Name field of the subscriber information of UE 171. When the D/GSCL on UE 171 and BSF 155 authenticate, BSF 155 assigns a B-TID, a temporary identifier, to the D/GSCL on UE 171. The B-TID will be used by UE 171 to bootstrap with SCS 161. In accordance with the improved bootstrapping method described herein, BSF 155 will update DNS server 163 with a B-TID to MTC-IWF 159 mapping.

As mentioned above, when a device bootstraps with a NAF in the GBA architecture, it only identifies itself with a Bootstrapping Transaction ID (B-TID). The B-TID 15 a temporary identifier, assigned by the Bootstrapping Server Function (BSF), which the BSF can map to a permanent device identifier and an authentication vector. The GBA architecture requires that the Network Application Function be able to detect the home network of the BSF from the B-TID.

SCS 161 will play the role of a NAF in the GBA. SCS 161 may locate and securely communicate with BSF 160 (via MTC-IWF 159) to obtain the shared key material that was pre-established between UE 171 and BSF 155. MTC-IWF 159 is associated with devices in its home network, thus SCS 161 reaches BSF 155 via the home network (i.e., HPLMN 167) of UE 171. MTC-IWF 159 uses the Tsp reference point 164 to pass messages from SCS 161 to BSF 155. In this way, the messaging on the Zn reference point will be mapped to the Tsp reference point. This embodiment involves the SCL, but can be used for a UE or M2M server without an SCL. In other words, it can be used for almost any application that is running on a UE and wants to bootstrap with a server.

Figure 5:
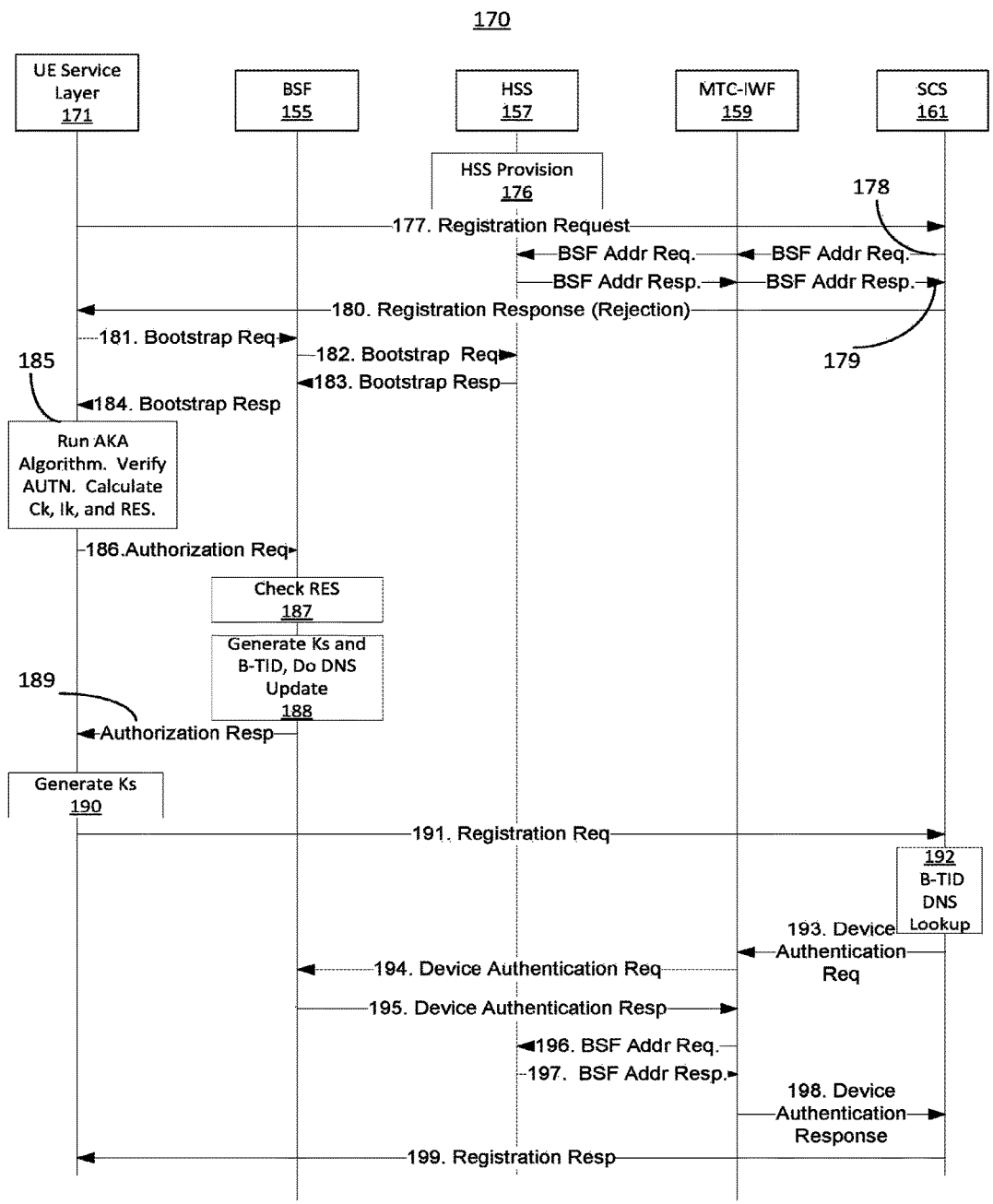
FIG. 5 illustrates a flow diagram of GBA D/GSCL bootstrapping.

FIG. 5 illustrates an exemplary call flow for bootstrapping and registering with an SCS utilizing the GBA, in accordance with one embodiment. Here, since BSF 155 is in the home network with MTC-IWF 159 and SCS 161 already has a relationship with the home network, a Zn-Proxy is not required and the Zn' reference point is not required to be implemented. Zn-Proxy and Zn' reference point are terms that are described in 3GPP TS 33.220.

As mentioned above, in order to support the bootstrapping process described herein, HSS 157 is provisioned (e.g., step 176) with additional information for each device, including, in the present embodiment, a BSF name field, a field for "permitted service capability servers," and a "permitted for GBA." In this example, the "permitted service capability servers" field will include the name that is associated with SCS 161. The BSF name field will hold the URI, IP address, or other similar address of BSF 155. The "permitted for GBA" field (e.g., flag) indicates if UE 171 should be provided with the bootstrapping service At step 177, a service layer 171 of a UE (e.g. UE 171) (hereinafter UE service layer 171) makes a service layer registration request to SCS 161 (i.e., NSCL). In this example, an sclCreateRequestIndication (Registration) is attempted without first authenticating.

After receiving the service layer registration, SCS 161 recognizes that UE service layer 171 is attempting to register without authenticating. SCS 161 decides that it wants UE service layer 171 to perform GBA bootstrapping. At step 178, SCS 161 requests from MTC-IWF 159 the BSF 155 address that should be used by UE service layer 171. SCS 161 uses a 3GPP External Device Identifier that was provided in step 177 to make this request. A Device Information Request (DIR) command is executed with parameters External ID, SCS ID, and Requested Param=BSF ID. The BSF address information requested by SCS 161 may be housed on the MTC-IWF or another computing device. For example, MTC-IWF 159 may request a BSF address from HSS 157. The request at step 178 includes the name of SCS 161 who initiated the request. A DIR Subscriber-Information-Request (SIR) Command may include an external ID, an SCS ID, and Service ID=AUTH_SERVER_ID.

At step 179, if SCS 161 is in the device's list of authorized SCSs, MTC-IWF 159 may respond with the BSF address.

MTC-IWF 159 receives the BSF address from HSS 157. At step 179, MTC-IWF 159 is informed of which SCS (e.g., SCS 161) is authorized to bootstrap with UE service layer 171 and MTC-IWF 159 knows the address of BSF 155. As discussed in more detail herein, Subscriber-Information-Answer (SIA) command may be the command executed.

At step 179, MTC-IWF 159 responds to SCS 161 with the BSF address. As discussed in more detail herein, Device-Information-Answer (SIA) command may be the command executed. At step 179, SCS 161 is informed of the IP address of BSF 155. In a typical scenario, BSF 155 is usually inside of a private IP address space that SCS 161 cannot reach. SCS 161 cannot use the private IP Address to access BSF 155. Due to the private IP address issue, SCS 161 passes the IP address to the UE service layer 171 (i.e. D/GSCL) and SCS 161 may access BSF 155 via MTC-IWF 159.

At step 180, SCS 161 issues a registration response rejecting the initial registration attempt. The response includes an indication of GBA bootstrapping and it includes the BSF address. At step 181, UE service layer 171, makes a bootstrap request to BSF 155. The bootstrap request at step 181 may be included in an HTTP request that has a 3GPP External Device Identifier of UE service layer 171. At step 182, BSF 155 makes a bootstrap request to HSS 157. The request at step 182 includes the 3GPP External Device Identifier of the UE 171. At step 183, HSS 157 responds to BSF 155 with an Authentication Vector for UE 171. At step 184, BSF 155 responds to UE service layer 171 bootstrap request at step 181 with a random challenge (RAND) and authentication token (AUTN) value to UE service layer 171. Generally, the AUTN value together with the RAND parameter authenticates servers to clients. Here, at step 185, UE service layer 171 may check the AUTN value to authenticate BSF 155 and UE service layer 171 calculates the cipher key (CK), integrity key (IK), and authentication response (RES). At step 186, the UE service layer 171 issues an authentication request, which may be an HTTP authentication request, to BSF 155. The HTTP authentication request includes the 3GPP External Device Identifier of the device and the RES that was calculated at step 185. At step 187, BSF 155 authenticates UE service layer 171 by checking that the RES equals an expected authentication response (XRES).

At step 188, BSF 155 generates a NAF specific key and a bootstrapping transaction identifier (B-TID) as defined in 3GPP TS 33.220. The NAF specific key (Ks_NAF) is used as M2M Root Key, Ks. As discussed in more detail herein, in addition to the requirements defined in 3GPP TS 33.220, the B-TID may be formatted in the following manner: <transaction-number><temporary-local-identifier>@<domain-identifier>. The <domain-identifier> field of the B-TID may be equal to the <domain-identifier> field of UE service layer 171 external ID. The <temporary-local-identifier> field of the B-TID is a temporary value that is assigned by BSF 155. BSF 155 maps the temporary value to the <local-identifier> field of UE service layer 171 external ID. The <transaction-number> field of the B-TID is a random value that is assigned by BSF 155. BSF 155 updates a DNS server (not shown) so that when a DNS lookup is performed on the B-TID, it resolves to the IP Address of an MTC-IWF (e.g., MTC-IWF 159) that may be used to reach BSF 155.

At step 189, BSF 155 responds to the UE service layer 171 with a HTTP 200 OK response to indicate that authentication was successful. The successful response includes B-TID and the lifetime of the key material. At step 190, UE service layer 171 generates the NAF specific (key, Ks_NAF) which is used as M2M Root Key, Ks. At step 191, UE Service Layer 171 makes a service layer registration request to SCS 161. The service layer registration request includes an indication that HTTP Digest Authentication is used, the B-TID. This message is sent to SCS 161 over the mId reference point between the UE service layer 171 and SCS 161 (NSCL). The 3GPP External Device Identifier of the UE is not included in this message, so the server would need to lookup the identity of the UE using the B-TID, which is a globally unique identifier that can be resolved to the device identifier.

At step 192, SCS 161 performs a DNS lookup on the B-TID to resolve the identifier to an IP Address of MTC-IWF 159. At step 193, SCS 161 makes a device authentication request to MTC-IWF. The request includes the B-TID. A DIR Command may be executed and include an SCS ID, Requested Param=GBA_BOOTSTRAPPING, and B-TID. At step 194, MTC-IWF 159 forwards the device authentication request from SCS 161 to BSF 155 over the Zn interface. A DIR Command may be executed and include an SCS ID, Requested Param=GBA_KEY_MATERIAL, and B-TID. At step 195, BSF 155 responds to MTC-IWF 159 with the M2M Root Key (Kmr) and the key lifetime over the Zn interface. A DIA Command may be executed and include an Authorization-Lifetime, Key-Material, and External Identifier.

At step 196, MTC-IWF 159 requests the subscriber information from HSS 157. The request at step 196 is used to obtain the IMSI that maps to the external identifier of UE service layer 171 and the identities of the SCS's that are authorized to access UE service layer 171. This request for the subscriber information includes the name of the 3GPP External Identifier. A SIR Command may be executed and include an External ID, Service ID=ID_MAPPING. At step 197, HSS 157 responds to MTC-IWF 159 with the IMSI and the list of SCS's that are allowed to access UE service layer 171. After completing step 197, MTC-IWF 159 knows if SCS 161 is authorized to bootstrap with UE service layer 171. An SIA command may be executed. Aforementioned step 196 and 197 may be skipped if the information is cached in MTC-IWF 159 from a previous response. At step 198, MTC-IWF 159 responds to SCS 161 with the M2M Root Key (Kmr) and the key lifetime. A DIA command may be executed. At step 199, SCS 161 responds with a response to indicate that the service layer registration was successful. The registration success message defined in ETSI TS 102 921 may be used to carry the response.

As discussed above, fields may need to be added to the subscriber database in an HSS to support bootstrapping in accordance with the method described above. In one embodiment, a BSF Name Field and a Permitted for GBA field are added. The BSF Name Field is the name of the BSF that the device uses when bootstrapping. This field may be a public IP address, a URI that the UE may resolve to a public IP address, or the like. Note that the BSF Name Field is not implied in 3GPP TS 23.682. In one embodiment, this information is permanent subscriber data.

For each permitted SCS, the subscription information will include the "Permitted for GBA" field. This field indicates if the SCS is authorized to use GBA procedures to bootstrap with the device. This field also is not implied in 3GPP TS 23.682. In one embodiment, this information is permanent subscriber data. The terms permanent and temporary, as used herein, have the same implication as they do in reference 3GPP TS 23.008. Permanent subscriber data is data that is changed by administration means. For example, a phone number of a subscriber and what web sites the subscriber is permitted to visit. Temporary subscriber data is data that may change (or expect to be changed) as a result of normal operation of the system. For example, the name of the base station that a subscriber is connected to will probably change as a subscriber drives through a city.

Figure 6A:
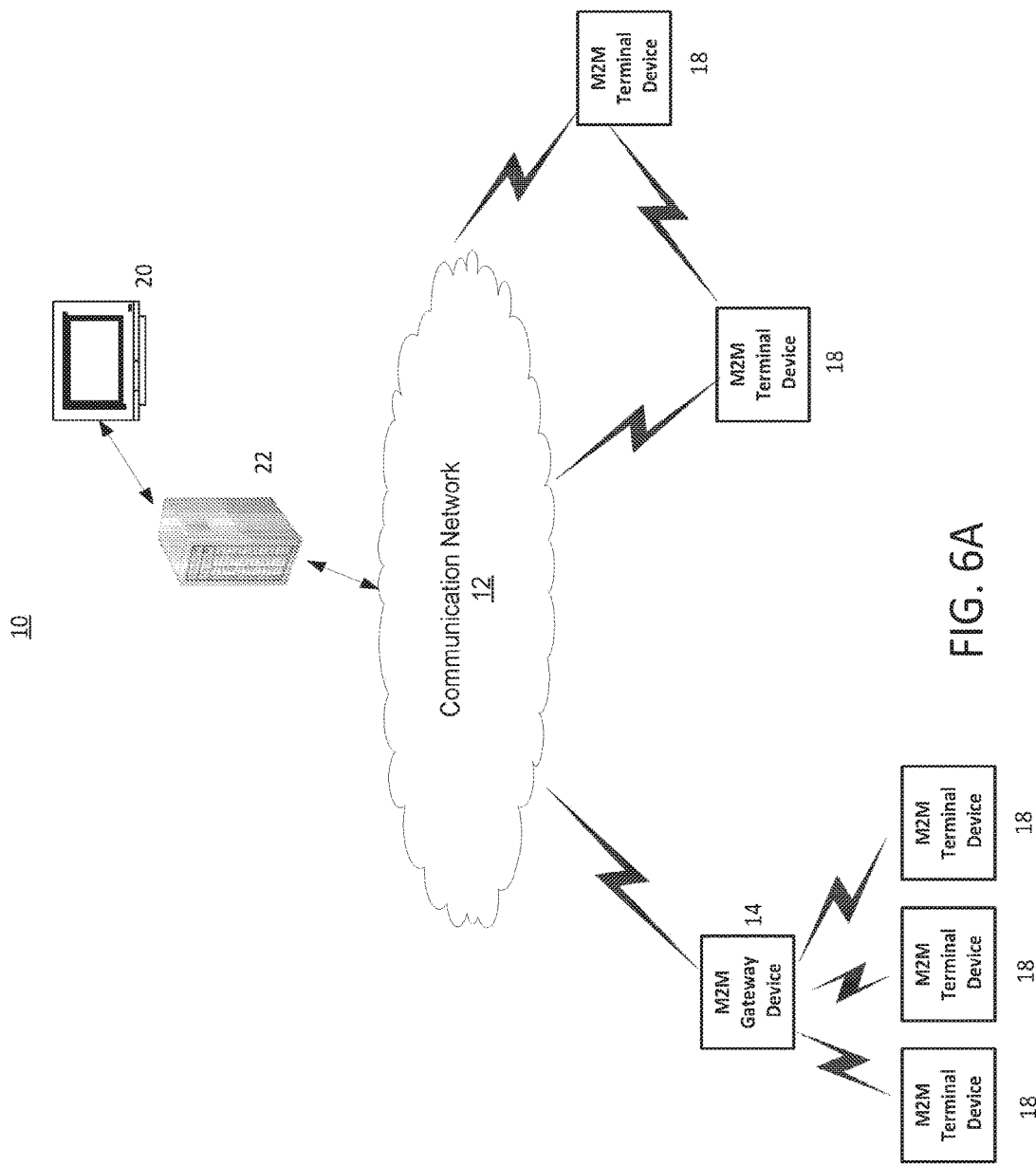
FIG. 6A is a system diagram of an example machine-to-machine (M2M) or Internet of Things (IoT) communication system in which one or more disclosed embodiments may be implemented.

FIG. 6A is a diagram of an example machine-to machine (M2M), Internet of Things (IoT), or Web of Things (WoT) communication system 10 in which one or more disclosed embodiments may be implemented. Generally, M2M technologies provide building blocks for the IoT/WoT, and any M2M device, gateway or service platform may be a component of the IoT/WoT as well as an IoT/WoT service layer, etc.

As shown in FIG. 6A, the M2M/IoT/WoT communication system 10 includes a communication network 12. The communication network 12 may be a fixed network (e.g., Ethernet, Fiber, ISDN, PLC, or the like) or a wireless network (e.g., WLAN, cellular, or the like) or a network of heterogeneous networks. For example, the communication network 12 may comprise of multiple access networks that provides content such as voice, data, video, messaging, broadcast, or the like to multiple users. For example, the communication network 12 may employ one or more channel access methods, such as code division multiple access (CDMA), time division multiple access (TDMA), frequency division multiple access (FDMA), orthogonal FDMA (OFDMA), single-carrier FDMA (SC-FDMA), and the like. Further, the communication network 12 may comprise other networks such as a core network, the Internet, a sensor network, an industrial control network, a personal area network, a fused personal network, a satellite network, a home network, or an enterprise network for example.

As shown in FIG. 6A, the M2M/IoT/WoT communication system 10 may include the Infrastructure Domain and the Field Domain. The Infrastructure Domain refers to the network side of the end-to-end M2M deployment, and the Field Domain refers to the area networks, usually behind an M2M gateway. The Field Domain includes M2M gateways 14 and terminal devices 18. It will be appreciated that any number of M2M gateway devices 14 and M2M terminal devices 18 may be included in the M2M/IoT/WoT communication system 10 as desired. Each of the M2M gateway devices 14 and M2M terminal devices 18 (e.g., UE 171 as described herein) are configured to transmit and receive signals via the communication network 12 or direct radio link. The M2M gateway device 14 allows wireless M2M devices (e.g. cellular and non-cellular) as well as fixed network M2M devices (e.g. PLC) to communicate either through operator networks, such as the communication network 12 or direct radio link. For example, the M2M devices 18 may collect data and send the data, via the communication network 12 or direct radio link, to an M2M application 20 or M2M devices 18. The M2M devices 18 may also receive data from the M2M application 20 or an M2M device 18. Further, data and signals may be sent to and received from the M2M application 20 via an M2M service layer 22, as described below. M2M devices 18 and gateways 14 may communicate via various networks including, cellular, WLAN, WPAN (e.g., Zigbee, 6LoWPAN, Bluetooth), direct radio link, and wireline, for example.

Figure 6B:
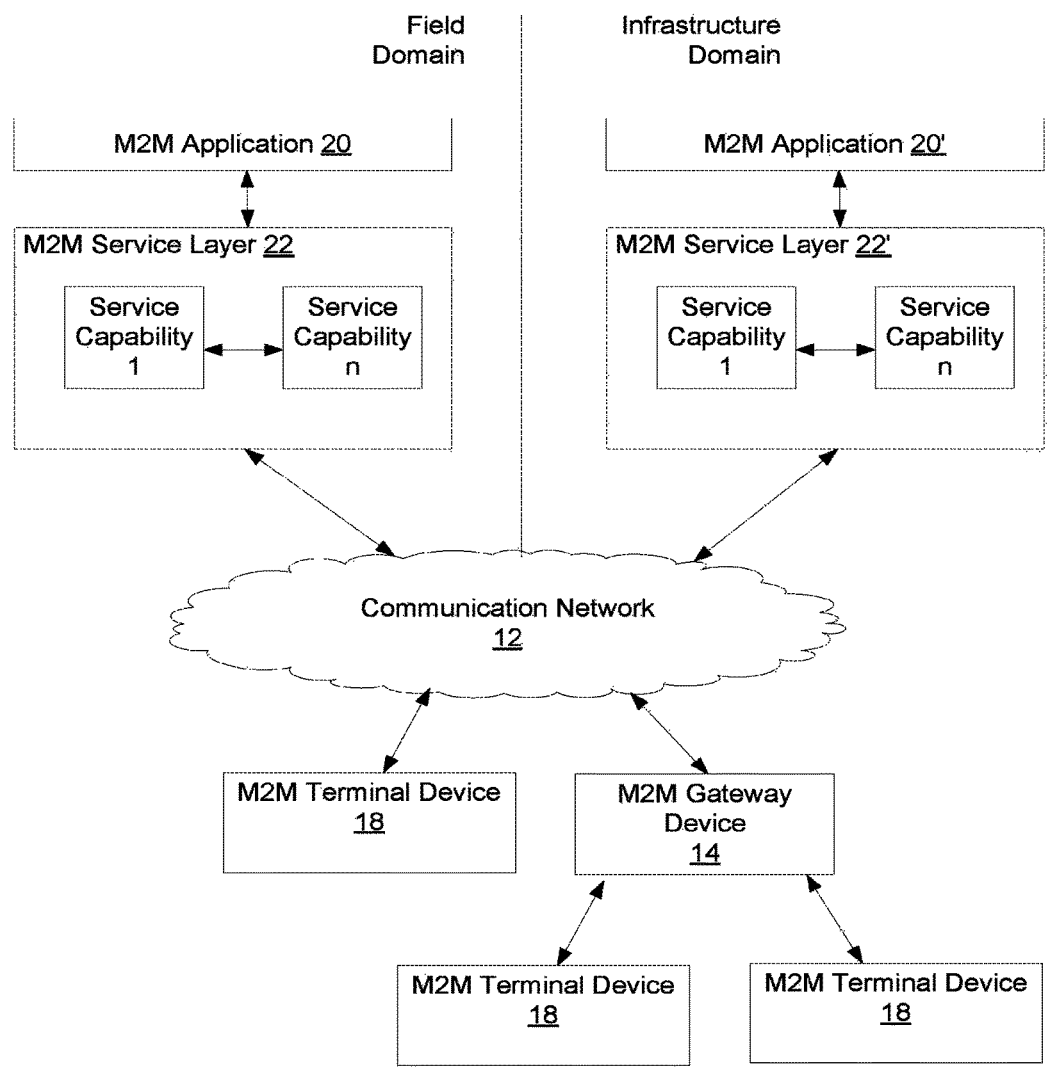
FIG. 6B is a system diagram of an example architecture that may be used within the M2M/IoT communications system illustrated in FIG. 6A.

Referring to FIG. 6B, the illustrated M2M service layer 22 in the field domain provides services for the M2M application 20, M2M gateway devices 14, and M2M terminal devices 18 and the communication network 12. It will be understood that the M2M service layer 22 may communicate with any number of M2M applications, M2M gateway devices 14, M2M terminal devices 18, and communication networks 12 as desired. The M2M service layer 22 may be implemented by one or more servers, computers, or the like. The M2M service layer 22 provides service capabilities that apply to M2M terminal devices 18, M2M gateway devices 14 and M2M applications 20. The functions of the M2M service layer 22 may be implemented in a variety of ways, for example as a web server, in the cellular core network, in the cloud, etc.

Similar to the illustrated M2M service layer 22, there is the M2M service layer 22' in the Infrastructure Domain. M2M service layer 22' provides services for the M2M application 20' and the underlying communication network 12' in the infrastructure domain. M2M service layer 22' also provides services for the M2M gateway devices 14 and M2M terminal devices 18 in the field domain. It will be understood that the M2M service layer 22' may communicate with any number of M2M applications, M2M gateway devices and M2M terminal devices. The M2M service layer 22' may interact with a service layer by a different service provider. The M2M service layer 22' may be implemented by one or more servers, computers, virtual machines (e.g., cloud/compute/storage farms, etc.) or the like.

Referring also to FIG. 6B, the M2M service layer 22 and 22' provide a core set of service delivery capabilities that diverse applications and verticals can leverage. These service capabilities enable M2M applications 20 and 20' to interact with devices and perform functions such as data collection, data analysis, device management, security, billing, service/device discovery etc. Essentially, these service capabilities free the applications of the burden of implementing these functionalities, thus simplifying application development and reducing cost and time to market. The service layer 22 and 22' also enables M2M applications 20 and 20' to communicate through various networks 12 and 12' in connection with the services that the service layer 22 and 22' provide.

In some embodiments, M2M applications 20 and 20' may include desired applications that communicate using the GBA, as discussed herein. The M2M applications 20 and 20' may include applications in various industries such as, without limitation, transportation, health and wellness, connected home, energy management, asset tracking, and security and surveillance. As mentioned above, the M2M service layer, running across the devices, gateways, and other servers of the system, supports functions such as, for example, data collection, device management, security, billing, location tracking/geofencing, device/service discovery, and legacy systems integration, and provides these functions as services to the M2M applications 20 and 20'.

The service layer (e.g., UE service layer 171) is a software middleware layer that supports value-added service capabilities through a set of Application Programming Interfaces (APIs) and underlying networking interfaces. An M2M entity (e.g., an M2M functional entity such as a device, gateway, or server/platform that may be implemented by a combination of hardware and software) may provide an application or service. Both ETSI M2M and oneM2M use a service layer that may contain the GBA methods of the present disclosure. ETSI M2M's service layer is referred to as the Service Capability Layer (SCL). The SCL may be implemented within an M2M device (where it is referred to as a device SCL (DSCL)), a gateway (where it is referred to as a gateway SCL (GSCL)) and/or a network node (where it is referred to as a network SCL (NSCL)). The oneM2M service layer supports a set of Common Service Functions (CSFs) (i.e., service capabilities). An instantiation of a set of one or more particular types of CSFs is referred to as a Common Services Entity (CSE) which can be hosted on different types of network nodes (e.g. infrastructure node, middle node, application-specific node). Further, the GBA of the present application can be implemented as part of an M2M network that uses a Service Oriented Architecture (SOA) and/or a resource-oriented architecture (ROA) to access services such as the GBA of the present application.

Figure 6C:
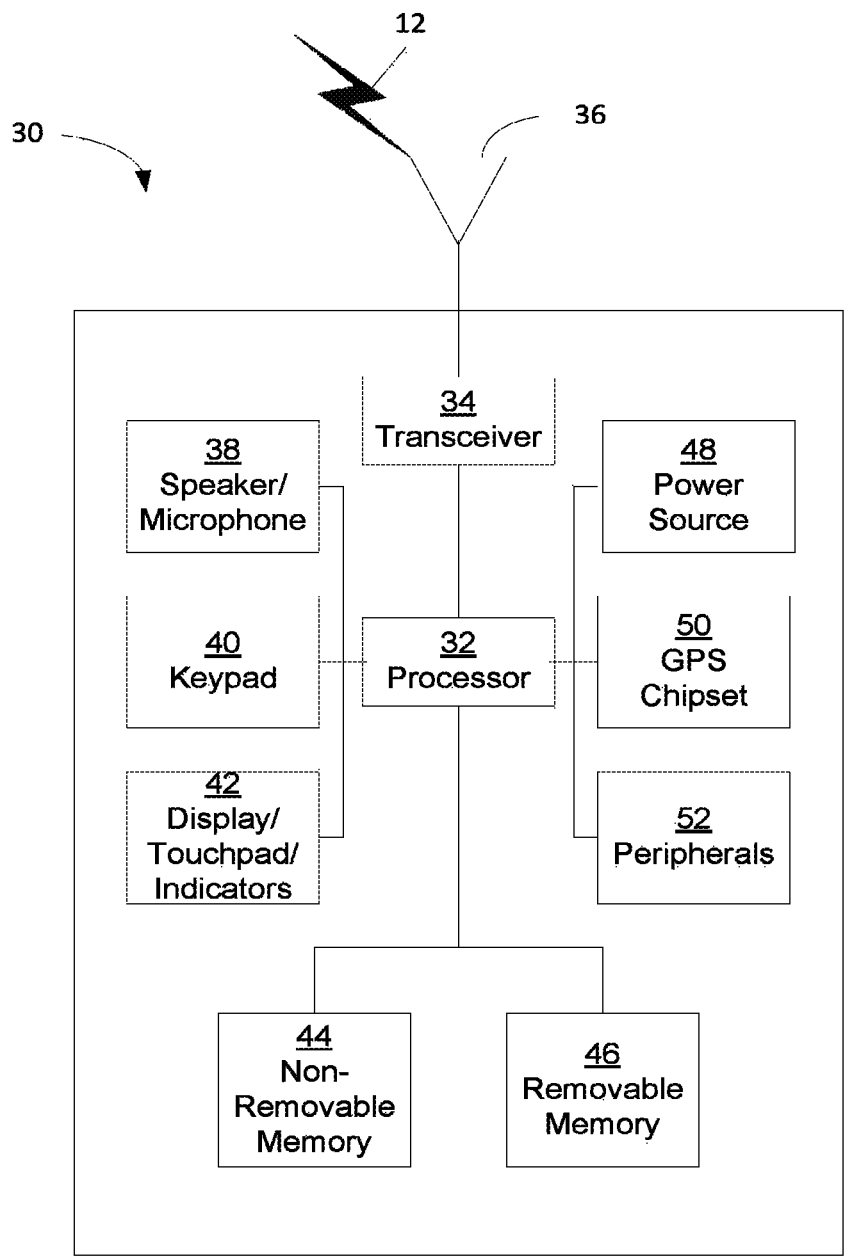
FIG. 6C is a system diagram of an example M2M/IoT terminal or gateway device that may be used within the communications system illustrated in FIG. 6A.

FIG. 6C is a system diagram of an example M2M device 30, such as an M2M terminal device 18 or an M2M gateway device 14 for example. As shown in FIG. 6C, the M2M device 30 may include a processor 32, a transceiver 34, a transmit/receive element 36, a speaker/microphone 38, a keypad 40, a display/touchpad 42, non-removable memory 44, removable memory 46, a power source 48, a global positioning system (GPS) chipset 50, and other peripherals 52. It will be appreciated that the M2M device 30 may include any sub-combination of the foregoing elements while remaining consistent with an embodiment. This device may be a device that uses the disclosed systems and methods for bootstrapping using GBA.

The processor 32 may be a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Array (FPGAs) circuits, any other type of integrated circuit (IC), a state machine, and the like. The processor 32 may perform signal coding, data processing, power control, input/output processing, and/or any other functionality that enables the M2M device 30 to operate in a wireless environment. The processor 32 may be coupled to the transceiver 34, which may be coupled to the transmit/receive element 36. While FIG. 6C depicts the processor 32 and the transceiver 34 as separate components, it will be appreciated that the processor 32 and the transceiver 34 may be integrated together in an electronic package or chip. The processor 32 may perform application-layer programs (e.g., browsers) and/or radio access-layer (RAN) programs and/or communications. The processor 32 may perform security operations such as authentication, security key agreement, and/or cryptographic operations, such as at the access-layer and/or application layer for example.

The transmit/receive element 36 may be configured to transmit signals to, or receive signals from, an M2M service platform 22. For example, in an embodiment, the transmit/receive element 36 may be an antenna configured to transmit and/or receive RF signals. The transmit/receive element 36 may support various networks and air interfaces, such as WLAN, WPAN, cellular, and the like. In an embodiment, the transmit/receive element 36 may be an emitter/detector configured to transmit and/or receive IR, UV, or visible light signals, for example. In yet another embodiment, the transmit/receive element 36 may be configured to transmit and receive both RF and light signals. It will be appreciated that the transmit/receive element 36 may be configured to transmit and/or receive any combination of wireless or wired signals.

In addition, although the transmit/receive element 36 is depicted in FIG. 6C as a single element, the M2M device 30 may include any number of transmit/receive elements 36. More specifically, the M2M device 30 may employ MIMO technology. Thus, in an embodiment, the M2M device 30 may include two or more transmit/receive elements 36 (e.g., multiple antennas) for transmitting and receiving wireless signals.

The transceiver 34 may be configured to modulate the signals that are to be transmitted by the transmit/receive element 36 and to demodulate the signals that are received by the transmit/receive element 36. As noted above, the M2M device 30 may have multi-mode capabilities. Thus, the transceiver 34 may include multiple transceivers for enabling the M2M device 30 to communicate via multiple RATs, such as UTRA and IEEE 802.11, for example.

The processor 32 may access information from, and store data in, any type of suitable memory, such as the non-removable memory 44 and/or the removable memory 46. The non-removable memory 44 may include random-access memory (RAM), read-only memory (ROM), a hard disk, or any other type of memory storage device. The removable memory 46 may include a subscriber identity module (SIM) card, a memory stick, a secure digital (SD) memory card, and the like. In other embodiments, the processor 32 may access information from, and store data in, memory that is not physically located on the M2M device 30, such as on a server or a home computer. The processor 32 may be configured to control lighting patterns, images, or colors on a display or indicators 42 in response to whether bootstrapping (e.g., bootstrapping using GBA) in some of embodiments described herein is successful or unsuccessful, or otherwise indicate the status of resource propagation processes. A user interface viewed via display 42 may give a user an option of using GBA for authentication.

The processor 32 may receive power from the power source 48, and may be configured to distribute and/or control the power to the other components in the M2M device 30. The power source 48 may be any suitable device for powering the M2M device 30. For example, the power source 48 may include one or more dry cell batteries (e.g., nickel-cadmium (NiCd), nickel-zinc (NiZn), nickel metal hydride (NiMH), lithium-ion (Li-ion), etc.), solar cells, fuel cells, and the like.

The processor 32 may also be coupled to the GPS chipset 50, which is configured to provide location information (e.g., longitude and latitude) regarding the current location of the M2M device 30. It will be appreciated that the M2M device 30 may acquire location information by way of any suitable location-determination method while remaining consistent with an embodiment.

The processor 32 may further be coupled to other peripherals 52, which may include one or more software and/or hardware modules that provide additional features, functionality and/or wired or wireless connectivity. For example, the peripherals 52 may include an accelerometer, an e-compass, a satellite transceiver, a sensor, a digital camera (for photographs or video), a universal serial bus (USB) port, a vibration device, a television transceiver, a hands free headset, a Bluetooth® module, a frequency modulated (FM) radio unit, a digital music player, a media player, a video game player module, an Internet browser, and the like.

Figure 6D:
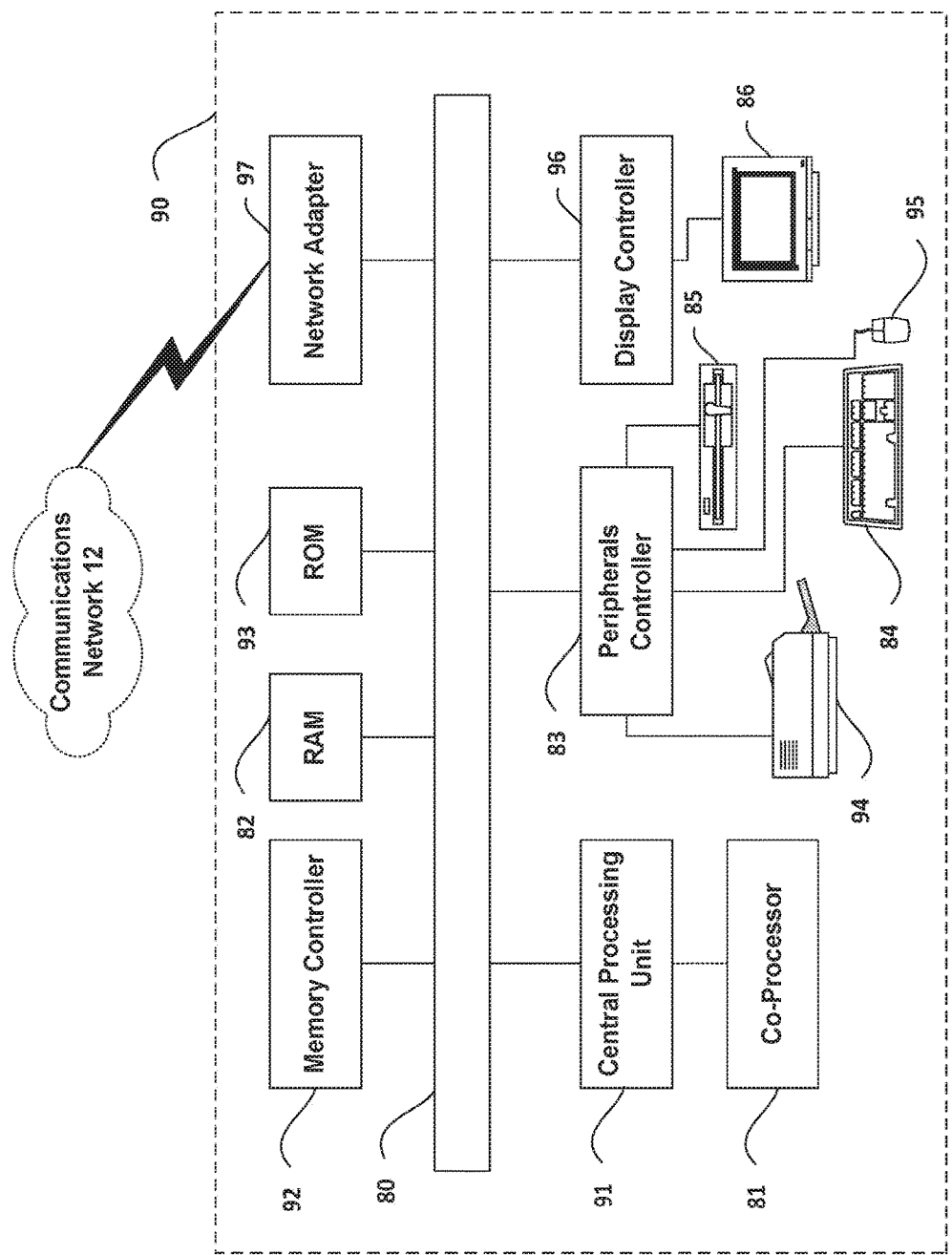
FIG. 6D is a block diagram of an example computing system in which aspects of the communication system of FIG. 6A may be embodied.

FIG. 6D is a block diagram of an exemplary computing system 90 on which, for example, the M2M service platform 22 of FIG. 6A and FIG. 6B may be implemented. Computing system 90 may comprise a computer or server and may be controlled primarily by computer readable instructions, which may be in the form of software, wherever, or by whatever means such software is stored or accessed. Such computer readable instructions may be executed within central processing unit (CPU) 91 to cause computing system 90 to do work. In many known workstations, servers, and personal computers, central processing unit 91 is implemented by a single-chip CPU called a microprocessor. In other machines, the central processing unit 91 may comprise multiple processors. Coprocessor 81 is an optional processor, distinct from main CPU 91, that performs additional functions or assists CPU 91. CPU 91 and/or coprocessor 81 may receive, generate, and process data related to the disclosed systems and methods for GBA, such as exchanging device authentication messages.

In operation, CPU 91 fetches, decodes, and executes instructions, and transfers information to and from other resources via the computer's main data-transfer path, system bus 80. Such a system bus connects the components in computing system 90 and defines the medium for data exchange. System bus 80 typically includes data lines for sending data, address lines for sending addresses, and control lines for sending interrupts and for operating the system bus. An example of such a system bus 80 is the PCI (Peripheral Component Interconnect) bus.

Memory devices coupled to system bus 80 include random access memory (RAM) 82 and read only memory (ROM) 93. Such memories include circuitry that allows information to be stored and retrieved. ROMs 93 generally contain stored data that cannot easily be modified. Data stored in RAM 82 can be read or changed by CPU 91 or other hardware devices. Access to RAM 82 and/or ROM 93 may be controlled by memory controller 92. Memory controller 92 may provide an address translation function that translates virtual addresses into physical addresses as instructions are executed. Memory controller 92 may also provide a memory protection function that isolates processes within the system and isolates system processes from user processes. Thus, a program running in a first mode can access only memory mapped by its own process virtual address space; it cannot access memory within another process's virtual address space unless memory sharing between the processes has been set up.

In addition, computing system 90 may contain peripherals controller 83 responsible for communicating instructions from CPU 91 to peripherals, such as printer 94, keyboard 84, mouse 95, and disk drive 85.

Display 86, which is controlled by display controller 96, is used to display visual output generated by computing system 90. Such visual output may include text, graphics, animated graphics, and video. Display 86 may be implemented with a CRT-based video display, an LCD-based flat-panel display, gas plasma-based flat-panel display, or a touch-panel. Display controller 96 includes electronic components required to generate a video signal that is sent to display 86.

Further, computing system 90 may contain network adaptor 97 that may be used to connect computing system 90 to an external communications network, such as network 12 of FIG. 6A and FIG. 6B.

It is understood that any or all of the systems, methods and processes described herein may be embodied in the form of computer executable instructions (i.e., program code) stored on a computer-readable storage medium which instructions, when executed by a machine, such as a computer, server, M2M terminal device, M2M gateway device, or the like, perform and/or implement the systems, methods and processes described herein. Specifically, any of the steps, operations or functions described above may be implemented in the form of such computer executable instructions. Computer readable storage media include both volatile and nonvolatile, removable and non-removable media implemented in any method or technology for storage of information, but such computer readable storage media do not includes signals. Computer readable storage media include, but are not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other physical medium which can be used to store the desired information and which can be accessed by a computer.

In describing preferred embodiments of the subject matter of the present disclosure, as illustrated in the Figures, specific terminology is employed for the sake of clarity. The claimed subject matter, however, is not intended to be limited to the specific terminology so selected, and it is to be understood that each specific element includes all technical equivalents that operate in a similar manner to accomplish a similar purpose.

This written description uses examples to disclose the invention, including the best mode, and also to enable any person skilled in the art to practice the invention, including making and using any devices or systems and performing any incorporated methods. The patentable scope of an invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed:

1. An apparatus comprising:
a processor; and
a memory coupled to the processor, the memory having stored thereon executable instructions that when executed by the processor cause the processor to effectuate operations comprising:
receiving a request for authentication of a device;
authenticating the device based on the request for authentication;
generating a bootstrapping transaction identifier (B-TID) based on the authenticating of the device;
providing instructions to update a domain name system (DNS) server with an internet protocol address associated with the B-TID,
wherein the internet protocol address is assigned to a machine type communication interworking function (MTC-IWF) that is used to reach the apparatus,
wherein the B-TID is temporary identifier; and
providing the B-TID to the device.

2. The apparatus of claim 1, wherein the request for authentication comprises an identifier of the device.

3. The apparatus of claim 1, wherein the apparatus is a bootstrapping server function (BSF).

4. The apparatus of claim 1, wherein the request comprises an authentication response.

5. The apparatus of claim 1, wherein the request comprises an authentication response based on a random challenge and authentication token value.

6. The apparatus of claim 1, wherein the request comprises an authentication response based on a random challenge and authentication token value from the apparatus.

7. A method comprising:
receiving a request for authentication of a device;
authenticating the device based on the request for authentication;
generating a bootstrapping transaction identifier (B-TID) based on the authenticating of the device;
providing instructions to update a domain name system (DNS) server with an internet protocol address associated with the B-TID, wherein the internet protocol address is assigned to a machine type communication interworking function (MTC-IWF) that is used to reach the apparatus,
wherein the B-TID is temporary identifier; and
providing the B-TID to the device.

8. The method of claim 7, wherein the request for authentication comprises an identifier of the device.

9. The method of claim 7, wherein the request comprises an authentication response.

10. The method of claim 7, wherein the request comprises an authentication response based on a random challenge and authentication token value.

11. The method of claim 7, wherein the request comprises an authentication response based on a random challenge and authentication token value from a bootstrapping server function.

12. A computer readable storage medium comprising computer executable instructions that when executed by a computing device cause said computing device to effectuate operations comprising:
 receiving a request for authentication of a device;
 authenticating the device based on the request for authentication;
 generating a bootstrapping transaction identifier (B-TID) based on the authenticating of the device;
 providing instructions to update a domain name system (DNS) server with an internet protocol address associated with the B-TID,
  wherein the internet protocol address is assigned to a machine type communication interworking function (MTC-IWF) that is used to reach the apparatus,
  wherein the B-TID is temporary identifier; and
 providing the B-TID to the device.

13. The computer readable storage medium of claim 12, wherein the request for authentication comprises an identifier of the device.

14. The computer readable storage medium of claim 12, wherein the request comprises an authentication response based on a random challenge and authentication token value.

15. The computer readable storage medium of claim 12, wherein the request comprises an authentication response based on a random challenge and authentication token value from a bootstrapping server function.

* * * * *